United States Patent
Loughmiller

(10) Patent No.: US 9,077,665 B1
(45) Date of Patent: Jul. 7, 2015

(54) TRANSFERRING VIRTUAL MACHINES AND RESOURCE LOCALIZATION IN A DISTRIBUTED FAULT-TOLERANT SYSTEM

(71) Applicant: Scott Loughmiller, San Francisco, CA (US)

(72) Inventor: Scott Loughmiller, San Francisco, CA (US)

(73) Assignee: Scale Computing, Inc., San Mateo, CA (US)

( * ) Notice: Subject to any disclaimer, the term of this patent is extended or adjusted under 35 U.S.C. 154(b) by 260 days.

(21) Appl. No.: 13/841,212

(22) Filed: Mar. 15, 2013

Related U.S. Application Data

(60) Provisional application No. 61/692,662, filed on Aug. 23, 2012.

(51) Int. Cl.
| | |
|---|---|
| G06F 15/173 | (2006.01) |
| H04L 12/911 | (2013.01) |
| G06F 9/455 | (2006.01) |
| G06F 9/50 | (2006.01) |
| G06F 9/48 | (2006.01) |

(52) U.S. Cl.
CPC ............ *H04L 47/70* (2013.01); *G06F 9/45558* (2013.01); *G06F 9/5077* (2013.01); *G06F 9/45533* (2013.01); *G06F 9/4856* (2013.01)

(58) Field of Classification Search
CPC .............. G06F 9/45558; G06F 9/5077; G06F 9/45533; G06F 2009/4557; G06F 9/4856
USPC .................................................. 709/224, 226
See application file for complete search history.

(56) References Cited

U.S. PATENT DOCUMENTS

| | | |
|---|---|---|
| 5,761,669 A | 6/1998 | Montague et al. |
| 6,023,706 A | 2/2000 | Schmuck et al. |
| 6,085,244 A | 7/2000 | Wookey |
| 6,275,898 B1 | 8/2001 | DeKoning |
| 6,675,258 B1 | 1/2004 | Bramhall et al. |
| 6,775,824 B1 | 8/2004 | Osborne et al. |
| 6,961,937 B2 | 11/2005 | Avvari et al. |
| 6,968,382 B2 | 11/2005 | McBrearty et al. |
| 6,981,102 B2 | 12/2005 | Beardsley et al. |
| 7,165,189 B1 | 1/2007 | Lakkapragada et al. |
| 7,343,587 B2 | 3/2008 | Moulden et al. |
| 7,370,101 B1 | 5/2008 | Lakkapragada et al. |
| 7,373,438 B1 | 5/2008 | DeBergalis et al. |
| 7,409,497 B1 | 8/2008 | Kazar et al. |
| 7,426,729 B2 | 9/2008 | Avvari et al. |
| 7,457,880 B1 | 11/2008 | Kim |
| 7,574,464 B2 | 8/2009 | Hitz et al. |
| 7,937,421 B2 | 5/2011 | Mikesell et al. |
| 7,991,969 B1 | 8/2011 | Chatterjee et al. |

(Continued)

*Primary Examiner* — Hieu Hoang

(57) ABSTRACT

Virtual machine localization in a distributed fault-tolerant system. Network traffic is minimized between nodes, while maintaining fault-tolerant behavior. Communication is measured between VM's, which are moved to minimize real network use. An availability group defines which resources cannot safely be disposed on a single device. When two VM's are in the same availability group, they are disposed as near as practical, but not on the same device. VM's and other resources they use are also disposed to minimize real network use. Minimizing real network use includes minimizing both channels occupied and communication distance. Availability groups can include both "hard" availability groups, for which data could be irretrievably lost, or "soft" availability groups, for which data could be lost, but could still be recovered with difficulty. Resource localization responds to both distance between VM's and their resources, and risk associated with losing data.

33 Claims, 3 Drawing Sheets

(56) References Cited

U.S. PATENT DOCUMENTS

| | | |
|---|---|---|
| 8,117,168 B1 * | 2/2012 | Stringham .................... 707/646 |
| 8,230,256 B1 * | 7/2012 | Raut ............................... 714/13 |
| 8,352,608 B1 * | 1/2013 | Keagy et al. ................. 709/226 |
| 8,499,066 B1 * | 7/2013 | Zhang et al. ................. 709/223 |
| 2002/0138559 A1 | 9/2002 | Ulrich et al. |
| 2004/0148138 A1 | 7/2004 | Garnett et al. |
| 2005/0246612 A1 | 11/2005 | Leis et al. |
| 2005/0273659 A1 | 12/2005 | Shaw |
| 2005/0278576 A1 | 12/2005 | Hekmatpour |
| 2006/0041780 A1 | 2/2006 | Budaya et al. |
| 2006/0085530 A1 * | 4/2006 | Garrett ........................ 709/223 |
| 2006/0085785 A1 * | 4/2006 | Garrett ............................ 718/1 |
| 2008/0021951 A1 | 1/2008 | Lurie et al. |
| 2009/0172666 A1 * | 7/2009 | Yahalom et al. ................. 718/1 |
| 2011/0029969 A1 * | 2/2011 | Venkataraja et al. ............. 718/1 |
| 2011/0055712 A1 * | 3/2011 | Tung et al. .................... 715/738 |
| 2013/0067294 A1 | 3/2013 | Flynn et al. |
| 2013/0132546 A1 * | 5/2013 | Vicat-Blanc Primet et al. ............................ 709/223 |
| 2013/0332926 A1 * | 12/2013 | Jakoljevic et al. ................ 718/1 |

* cited by examiner

TRANSFERRING VIRTUAL MACHINES AND RESOURCE LOCALIZATION IN A DISTRIBUTED FAULT-TOLERANT SYSTEM

CROSS-REFERENCE TO RELATED APPLICATIONS

Inventions described in this application can also be used in combination or conjunction, or otherwise, with techniques described in one or more of the following documents.

U.S. Provisional Patent Application 61/651,391, filed May 24, 2012, titled "Unified hypervisor and distributed fault-tolerant storage", U.S. Provisional Patent Application 61/692,666, filed Aug. 23, 2012, titled "Virtual machine automated selection"; and U.S. Provisional Patent Application 61/692,660, filed Aug. 23, 2012, titled "Virtual machine resource display".

Each of these documents is hereby incorporated by reference as if fully set forth herein. These documents are sometimes referred to herein as the "incorporated disclosures".

BACKGROUND

In distributed computing systems, multiple computing devices operate concurrently to execute possibly different application programs. For example, multiple computing devices can each execute a hypervisor disposed to emulate one or more virtual machines, each virtual machine executing an application server on behalf of client devices which make requests of, and receive responses from, that application server. When two virtual machines communicate, those virtual machines generate virtual network messages, which are emulated by the hypervisors hosting those virtual machines.

One problem with known systems is that when virtual machines communicate, the virtual network messages they exchange are emulated using real network messages on a real communication network, if those virtual machines are hosted by distinct processing devices. These real network messages use communication bandwidth and other resources. This can produce high latency or low rates of communication between those virtual machines, and which can adversely effect other devices contending for use of the communication network. This problem can also occur when a virtual machine hosted by one device accesses resources maintained on another device, such as network connections, storage elements, and possibly other resources.

SUMMARY OF THE DESCRIPTION

We provide optimization of virtual machine location in a distributed fault-tolerant system, so that network traffic is minimized between multiple nodes, while maintaining fault-tolerant behavior by the distributed system. In one embodiment, communication is measured between two virtual machines, or between pairs of virtual machines in a set thereof. Virtual machines are disposed to minimize real network resource use due to their communication with each other. To maintain fault-tolerant behavior of the distributed system, "availability groups" are defined for virtual machines. An availability group defines which resources cannot safely be disposed on a single device, because that single device would then pose a single point of failure. When two virtual machines cannot safely be disposed on a single device, virtual machines are disposed as near as can be practical to minimize real network resource use and to maintain fault-tolerant behavior.

In one embodiment, virtual machines and other resources, which the virtual machines seek to access, are also disposed to minimize real network resource use and to maintain fault-tolerant behavior, one or more virtual machines being transferred to achieve this. These other resources could include a network connection (real or virtual), a set of data, a hardware device or driver (real or virtual), or otherwise. In cases where those resources can be moved, either virtual machines or resources or both might be transferred between physical devices. In cases where those resources cannot practically be moved, virtual machines might be transferred between physical devices. Availability groups are defined both for pairings of virtual machines, for associations of virtual machines with resources, and for pairings of resources.

In one embodiment, a fault-tolerant distributed system emulates network traffic between virtual machines using a private network among the multiple nodes of that distributed system. The private network is not generally accessible to devices outside that distributed system. The private network might couple each node to every other node using a single communication channel, or might alternatively couple each individual node to one or more other nodes using separate communication channels. In the latter case, minimizing real network resource use includes aspects of both minimizing use of those communication channels and minimizing communication distance (however measured) between virtual machines and their resources.

In one embodiment, availability groups could be defined with respect to more than one degree of safety in the event of a failure. For example, a $1^{st}$ set of availability groups might be determined to be "hard" availability groups, for which data could be irretrievably lost by a single point of failure. In this example, a $2^{nd}$ set of availability groups might be determined to be "soft" availability groups, for which data could be lost by a single point of failure, but that lost data could be recovered with some measure of cost or difficulty. In such cases, resource localization is responsive both to cost associated with distance between virtual machines and their resources, and cost or risk associated with inconvenience for data recovery in the event of failure.

DETAILED DESCRIPTION

Terms and Phrases

Terms and phrases used herein are intended to be exemplary, not limiting in any way. Some examples of terms and phrases used herein include the following:

The text "availability group", and variants thereof, generally refers to any collection of virtual machines, or any collection of data (including data maintained by virtual machines), or any other collection of resources which could be lost by a partial or complete failure of a node. For example, when a $1^{st}$ virtual machine and a $2^{nd}$ virtual machine maintain mirrored databases, those two virtual machines, as well as their mirrored databases, are considered part of one availability group. For another example, when a $1^{st}$ virtual machine and a $2^{nd}$ virtual machine provide backup for each other, those two virtual machines, are considered part of one availability group.

The text "fault-tolerant", and variants thereof, generally refers to any system element which is protected against failure, such as against a single point of failure. For example, a storage system which maintains redundant data, or which maintains multiple copies of data, such as a RAID system, is fault-tolerant in the sense that it does not lose data even in the event of a disk drive failure.

The text "virtual machine", sometimes abbreviated "VM" herein, and variants thereof, generally refers to any emulated computing device. For a $1^{st}$ example, a virtual machine could include a "guest operating system", which controls the virtual machine, and an application which calls upon that guest operating system to provide access to the virtual machine, similar to a real operating system providing access to a real computing device. For a $2^{nd}$ example, a virtual machine could include a virtual network connection, emulated by the physical device hosting the virtual machine, similar to a real device having access to a real network connection.

After reading this application, those skilled in the art would recognize and understand all terms and phrases used in combination or conjunction with these terms and phrases, without undue experimentation or new invention.

FIGURES AND TEXT

Multi-Node System

Figure 1:
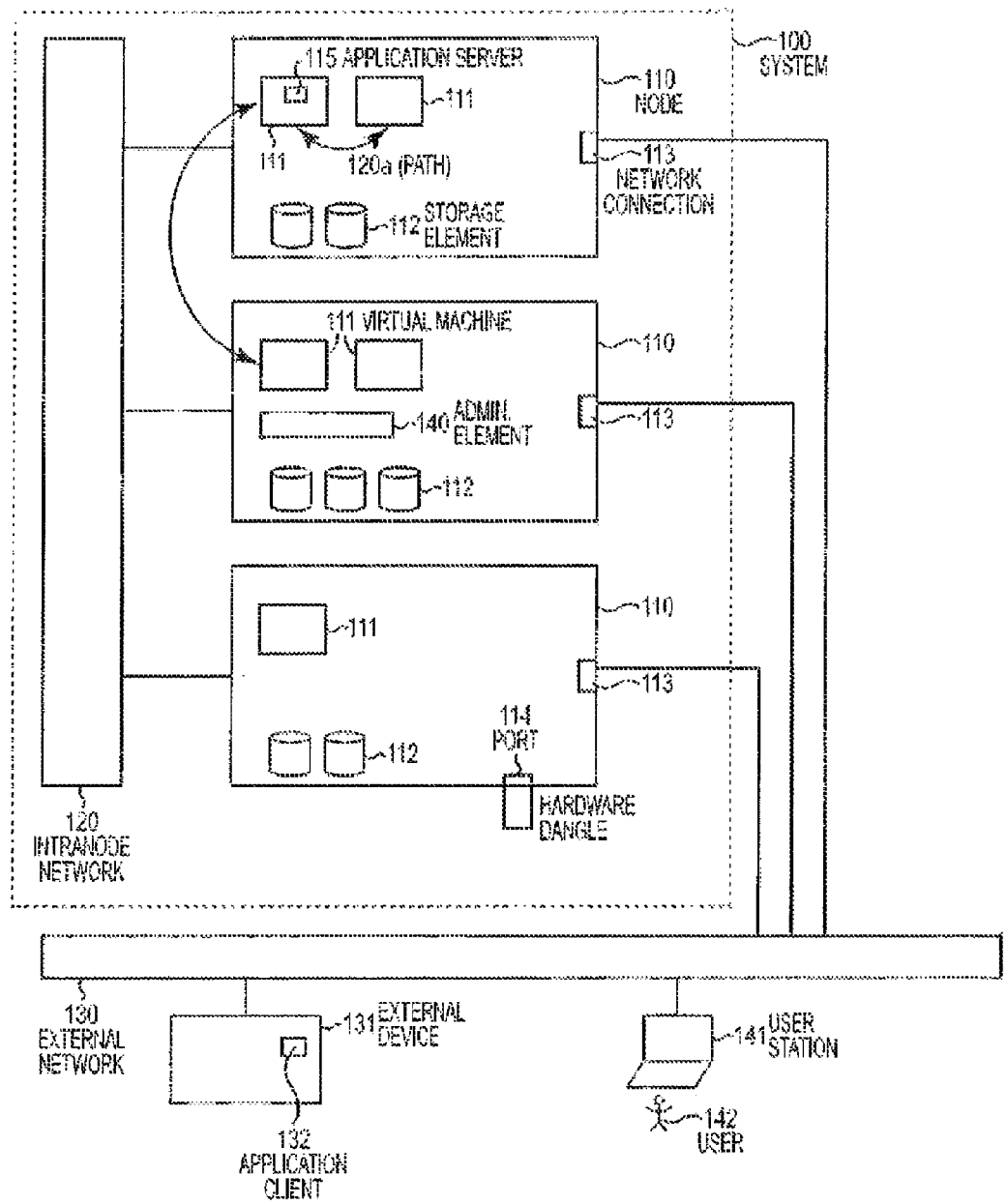
FIG. 1 shows a conceptual block diagram of a $1^{st}$ system.

FIG. 1 shows a conceptual drawing of a system.

A $1^{st}$ system 100 includes elements shown in the figure, and possibly other elements, including at least a set of nodes 110 and an inter-node network 120. Each individual node 110 is coupled to the inter-node network 120, and is capable of communicating with other nodes 110 using the inter-node network 120. In one embodiment, the system 100 is coupled to one or more external networks 130, with the effect that external devices 131 (coupled to those external networks 130) can communicate with the system 100. In one embodiment, the inter-node network 120 is decoupled, logically or physically, from the external networks 130, with the effect that communication on the inter-node network 120 and the external networks 130 are substantially isolated.

In one embodiment, each node 110 includes an operating system kernel, executed by the node's one or more processors in response to instructions maintained in the node's memory or storage.

The operating system kernel provides a hypervisor for emulating and hosting one or more virtual machines 111. In one embodiment, each virtual machine 111 includes a guest operating system and an application server. The application server calls upon the guest operating system for services it provides to control the virtual machine 111. The guest operating system calls upon the hypervisor for services the operating system kernel provides to control the physical node 110.

The operating system kernel also provides a storage system which replicates data at storage elements 112 at multiple nodes 110. The storage system replicates each node's data at those storage elements 112 at multiple nodes 110, by communicating that data between nodes 110 using the inter-node network 120, with the effect that if any one storage element 112 fails (or even if any one entire node 110 fails), that data can be recovered from another node 110. This also has the effect that each node 110 can obtain data maintained at other nodes 110 by requesting that data using the inter-node network 120.

The hypervisor provides each virtual machine 111 with access to the storage system, with the effect that each virtual machine 111 is capable of accessing data maintained at any one or more of the nodes 110. The hypervisor also provides a virtual machine memory for each virtual machine 111, using physical memory and physical storage at each node 110, with the effect that the hypervisor is capable of transferring virtual machines 111 between nodes 110 without loss of operating data when transferring a virtual machine 111.

Each node 110 optionally includes other resources, such as a network connection 113 to one or more of the external networks 130, a port 114 coupled to a hardware element such as a USB "dongle" or other device, or another hardware element. This has the effect that each virtual machine 111 can access the other resources, either at the node 110 where that virtual machine 111 is being hosted, or at another node 110, in the latter case by communicating with that other node 110 using the inter-node network 120.

Virtual Network Traffic

The hypervisor provides each virtual machine 111 with a virtual network connection, with the effect that each virtual machine 111 can communicate with other virtual machines in, either on the same node 110 or a different node 110, and with the other resources maintained at each node 110, also either on the same node 110 or a different node 110. Similarly, each virtual machine 111 can communicate with external devices 131 using one of the external networks 130, so long as at least one node 110 has a network connection 113 to that external network 130.

In one embodiment, one or more virtual machines 111 provide an application server 116, with which application clients 132 communicate using a client-server technique. These application clients 132 might be executed at other virtual machines in, either on the same node 110 or a different node 110, or at external devices 131. Those application servers 116 receive network messages 133 (in one embodiment, TCP/IP packets) from application clients 132, and respond by sending network messages 133 to application clients 132. Network messages 133 could be exchanged between virtual machines in and external devices 131 coupled to one or more external networks 130. Network messages 133 could also be exchanged between pairs of virtual machines in, either on the same node 110 or a different nodes 110.

Each virtual machine 111 could also communicate with another virtual machine 111, or with a resource, either hosted at the same node 110 or hosted at another node 110, using a non-client-server technique. When a virtual machine 111 communicates with another virtual machine 111, or with a resource, network messages 133 are exchanged between the virtual machine 111 and the other virtual machine 111, or with the resource.

When a virtual machine 111 and its communication partner (either another virtual machine 111 or a resource) are hosted at the same node 110, network messages 133 are exchanged using a virtual connection, provided by the node 110 coupling network messages in memory between those virtual machines in, as shown by a communication path 120a. When a virtual machine 111 and its communication partner (either another virtual machine 111 or a resource) are hosted at different nodes no, the virtual connection is provided by the node 110 coupling network messages to the other node no using the inter-node network 120, as shown by a communication path 120b.

This has the effect that when a virtual machine 111 communicates with a communication partner (either another virtual machine 111 or a resource) hosted at the same node 110, the communication path 120a is entirely within that node 110, and that node 110 emulates all network traffic for both the virtual machine 111 and the communication partner, with the effect that no real network messages are actually required to be sent or received using any network. This applies to both the inter-node network 120 and the external network 130. However, when a $1^{st}$ virtual machine 111, at a $1^{st}$ node 110, communicates with a $2^{nd}$ virtual machine 111, at a $2^{nd}$ node 110, the communication path 120b is between different nodes 110, and the $1^{st}$ node 110 emulates network traffic for the $1^{st}$ virtual machine 111, while the $2^{nd}$ node 110 emulates network traffic for the $2^{nd}$ virtual machine 111. This has the effect that at least some real network messages are exchanged between the $1^{st}$ virtual machine 111 and the $2^{nd}$ virtual machine 111, such as using the communication path 120b.

Transferring Virtual Machines

The system 100 includes an administrative element 140, either disposed within an operating system kernel, disposed within a virtual machine 111, or disposed as another application program. The administrative element 140 could be executed at one or more nodes 110, or at some external device. In one embodiment, when executed at more than one node 110, the administrative element 140 would include instructions replicated at each of those nodes 110, and would cooperate by maintaining a fault-tolerant distributed database, using the inter-node network 120 for communication and for assuring fault-tolerance of that distributed database in the event of a node 110 failure.

The administrative element 140 includes a traffic monitor, which includes a set of monitoring instructions, which reviews traffic on the inter-node network 120, and determines if that traffic is excessive due to communication between virtual machines 111, such as illustrated by communication path 120b. The administrative element optionally includes a user interface accessible from a user interface device 141, which reports information obtained by the traffic monitor to one or more users 142, such as system administrators.

The administrative element 140 includes a traffic optimizer, which includes a set of instructions directed to the operating system kernel to transfer one or more virtual machines 111. In response to the monitor, the traffic optimizer determines if a virtual machines 111 and a communication partner (either another virtual machine 111 or a resource) are on different nodes 110 and are exchanging inter-node network messages 133, such as using a communication path 120b. The traffic optimizer determines if the virtual machines 111 and the communication partner are exchanging "too many" inter-node network messages 133, where "too many" is an optimization parameter which can be set by one or more users 142, or which can be determined by the administrative element 140 in response to a measure of delay observed when the virtual machine 111 and the communication partner exchange inter-node network messages 133.

In one embodiment, the traffic optimizer determines that inter-node network messages 133 are "too many" so long as the traffic optimizer can reduce a measure of those inter-node network messages 133 (such as their number, or the amount of data exchanged, or the amount of network bandwidth they require). This has the effect that the traffic optimizer will continue to make transfers of virtual machines 111 closer to their communication partners, such as onto the same node 110 as their communication partners, so long as that measure of network messages 133 is reduced by those transfers.

In one embodiment, the traffic optimizer determines how best to transfer one or more of those virtual machines 111 to the same node 110 as the other. For example, if a $1^{st}$ virtual machine 111 at a $1^{st}$ node 110 is exchanging inter-node network messages 133 with a $2^{nd}$ virtual machine at a $2^{nd}$ node 110, it might be possible to transfer the $1^{st}$ virtual machine 111 to the $2^{nd}$ node 110, to transfer the $2^{nd}$ virtual machine 111 to the $1^{st}$ node 110, or to transfer both virtual machines 111 to some $3^{rd}$ node 110. If the transfer is possible, the traffic optimizer requests the operating system kernel to make the transfer, with the effect that inter-node network traffic 133 is reduced, without losing any of the virtual machines' functionality.

Availability Groups

The traffic optimizer is also responsive to a set of availability groups, each of which indicates a set of virtual machines 111 and resources which should not be placed on the same node 110. The administrative element 140 includes, or at least has access to, a database of availability groups. The database of availability groups would include a list of groups, each of which includes a list of virtual machines 111 and any other resources included in that availability group. In one embodiment, the database of availability groups is maintained on the in a fault-tolerant distributed filesystem using the storage elements 112.

In one embodiment, an availability group generally refers to virtual machines 111 and resources which should not be placed on the same node 110 because data could be lost by a partial or complete failure of that node 110. For example, when a $1^{st}$ virtual machine and a $2^{nd}$ virtual machine maintain mirrored databases, those two virtual machines, as well as their mirrored databases, are considered part of one availability group. For another example, when a $1^{st}$ virtual machine and a $2^{nd}$ virtual machine provide backup for each other, those two virtual machines, are considered part of one availability group.

While this application primarily describes availability groups with regard to presenting a single point (or multiple points) of failure for the system 100, in the context of the invention, there is no particular requirement for any such limitation. An availability group may be defined in response to other factors. For example, an availability group may be defined in response to the possibility that one node 110 is needed for rapid service, and should be maintained lightly-loaded.

For a $1^{st}$ example, there might be an availability group which includes both the $1^{st}$ virtual machine 111 and the $2^{nd}$ virtual machine 111. The traffic optimizer refrains from transferring virtual machines 111 if placing the $1^{st}$ virtual machine 111 and the $2^{nd}$ virtual machine on the same node 110 would present a single point of failure for the system 100, that is, if that one same node 110 were to fail. In such cases, the traffic optimizer would not make the transfer because, while it would reduce inter-node network messages 133, it would reduce the system's reliability.

For a $2^{nd}$ example, there might be an availability group which includes both the $1^{st}$ virtual machine 111 and a resource communication partner for that $1^{st}$ virtual machine 111. The traffic optimizer similarly refrains from transferring virtual machines iii if placing the $1^{st}$ virtual machine 111 and its resource communication partner on the same node 110 would present a single point of failure for the system 100.

For a $3^{rd}$ example, the $1^{st}$ virtual machine 111 and the $2^{nd}$ virtual machine 111 might be collectively too large to fit on the same node 110. For example, the $1^{st}$ virtual machine 111 and the $2^{nd}$ virtual machine 111 might collectively use too much memory for efficient operation on a single node 110. In such cases, the administrative element 140 would not make the transfer because it would not be feasible to execute the two virtual machines 111 on the same node 110.

For a $4^{th}$ example, the $1^{st}$ virtual machine 111 or the $2^{nd}$ virtual machine 111 might use other resources which cannot also be collected onto the same node 110 as the two virtual machines 111. For one example, the $1^{st}$ virtual machine 111 might use a resource which is in an availability group with the $2^{nd}$ virtual machine 111. For another example, the $1^{st}$ virtual machine 111 and the $2^{nd}$ virtual machine in might each use resources which otherwise cannot be collected onto the same node 110 (they might be hardware elements which cannot be moved, or a different availability group might include those resources). In this case, the administrative element 140 would not make the transfer because it would reduce the system's reliability.

However, the administrative element 140 could make whatever transfers would be useful to reduce inter-node network messages 133, even if the $1^{st}$ virtual machine 111 or the $2^{nd}$ virtual machine in could not be placed on the same node 110. For example, if transferring both the virtual machines in and some resource onto the same node 110 would not be feasible, it could still be feasible to transfer the virtual machines 111 onto the same node 110 and leave that resource on a different node 110. This would reduce inter-node network messages 133 if communication between the virtual machines 111 and the resource is itself less frequent than communication between the virtual machines in and each other.

Types of Availability Groups

In one embodiment, the administrative element 140 defines availability groups with respect to more than one degree of safety in the event of a failure. In one embodiment, the administrative element 140 distinguishes between a $1^{st}$ set of availability groups, "hard" availability groups, and a $2^{nd}$ set of availability groups, "soft" availability groups.

In the former case, "hard" availability groups, data could be irretrievably lost by a single point of failure. For example, a hard availability group could include both sets of data maintained on mirrored storage elements (such as disk drives), when there are only two sets being maintained. In such cases, if both sets of data are maintained on the same storage element, and that storage element fails, the data cannot be recovered. In the latter case, "soft" availability groups, data could be lost by a single point of failure, but that lost data could be recovered with some measure of cost or difficulty. For example, a soft availability group could include data that is known to be computed or derived from safely maintained source data. So long as the source data is safely maintained, a risk of losing the computed or derived data can be taken, as the computed or derived data can be re-computed or re-derived from the source data.

For hard availability groups, the administrative element 140 does not place virtual machines 111 which are in the same (hard) availability group, or virtual machines 111 which are in the same availability group as a resource, on the same node 110, as that would present a single point of failure for the system 100. For example, the administrative element 140 does not place both sets of data maintained on mirrored storage elements on the same node 110. In alternative embodiments, one or more virtual machines 111, or users 142, can mark data in availability groups that appear "hard" as really being acceptable to lose. For example, data which has been cached from a distant external device 131 would appear to the administrative element 140 as belonging to a hard availability group, as that data cannot be recovered by the system 100 if a single node 110 is lost; however, that data one or more virtual machines 111, or to one or more users 142, might know that the data is just a cached copy, and can be recovered from the distant external device 131 upon request.

For soft availability groups, the administrative element 140 determines a cost associated with maintaining more than one virtual machine 111, or a virtual machine 111 and its resource, on separate nodes 110, and compares that with the cost or risk associated with losing the data in the soft availability group. For example, if the savings in inter-node network messages 133 would be relatively small, the administrative element 140 would determine that even membership in a soft availability group would be too risky to allow for losing that data (or too costly to recover that data in the event of an error). In contrast, if the savings in inter-node network messages 133 would be relatively large, the administrative element 140 would determine that membership in a soft availability group would not be sufficiently costly, in the event of an error, to offset the savings from placing two virtual machines iii, or a virtual machine 111 and its resource, at the same node 110.

Other Behavior

While this application primarily describes monitoring network traffic between one virtual machine 111 and its communication partner (either another virtual machine 111 or a resource), in the context of the invention, there is no particular requirement for any such limitation. For example, in one embodiment, network traffic could occur among a set of virtual machines 111 (and optionally, a set of resources), where the collective network traffic among the entire set of virtual machines 111 and resources, rather than any particular network traffic between individual virtual machines 111 and communication partners, is of interest. In such cases, the traffic monitor would monitor network traffic, collectively, among those virtual machines and the collective set of their communication partners, and the traffic optimizer would determine, collectively, where to locate each of those virtual machines.

While this application primarily describes maintaining fault-tolerant behavior of the distributed system using availability groups, in the context of the invention, there is no particular requirement for any such limitation. For a $1^{st}$ example, fault-tolerant behavior could be determined or maintained responsive to one or more other factors, such as by examining copies of data maintained by virtual machines and their communication partners. For a $2^{nd}$ example, fault-tolerant behavior could be determined or maintained responsive to information from one or more users 142. In such cases, the traffic optimizer would limit transfer of virtual machines 111 response to those one or more other factors, or in response to that information from one or more users 142.

While this application primarily describes availability groups, and primarily describes fault-tolerant behavior of the distributed system, with respect to single points of failure, in the context of the invention, there is no particular requirement for any such limitation. For example, availability groups and fault-tolerant behavior could be responsive to two or more points of failure, similar to some RAID systems which tolerate failures of two (and sometimes more) disk drives. In such cases, the traffic optimizer would limit transfer of virtual machines 111 response to that different definition of availability groups or fault-tolerant behavior.

As described below, the system 100 could also transfer virtual machines 111 so they are closer to their communication partners, for some description of being closer. One such system is described with respect to FIG. 2, in which virtual machines iii are maintained on nodes 110 which have inter-node connections, but which lack an inter-node network 120 to which all nodes 110 are coupled. Similarly, as described below, one such system is described with respect to FIG. 2, in which virtual machines in are transferred to nodes 110 which are closer to their communication partners (either another virtual machine 111 or a resource), but are not necessarily on the same node 110 as their communication partners.

Coupling Nodes Using Multiple Connections

Figure 2:
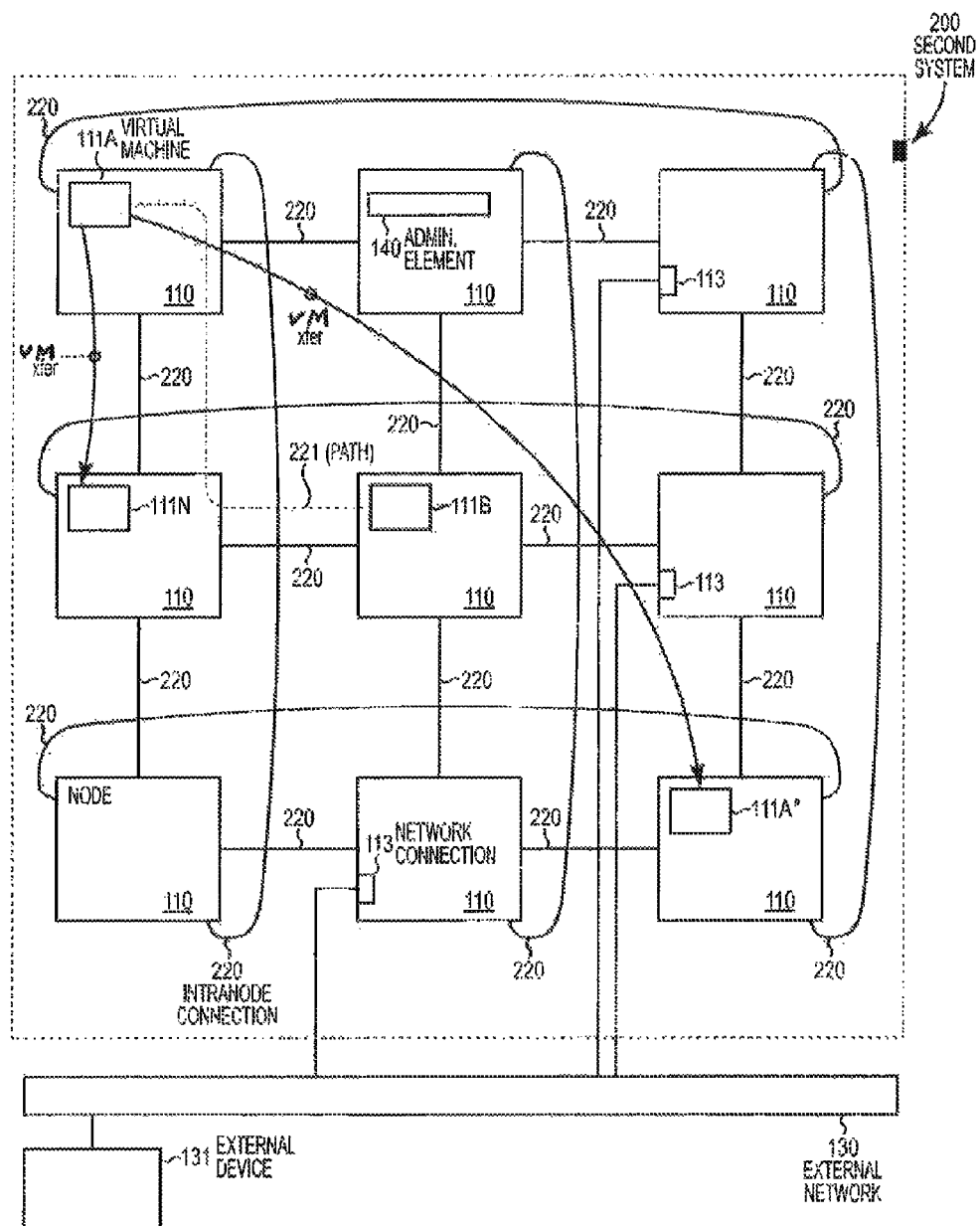
FIG. 2 shows a conceptual block diagram of a $2^{nd}$ system.

FIG. 2 shows a conceptual drawing of a $2^{nd}$ system.

A $2^{nd}$ system 200 includes elements shown in the figure, and possibly other elements, including at least a set of nodes 110 and a set of inter-node connections 220. In contrast with the FIG. 1, the set of inter-node connections 220 do not each couple each node 110 to each other node 110. Instead, each inter-node connection 220 couples a $1^{st}$ node 110 to a $2^{nd}$ node 110. This has the effect that each node no is coupled to each other node 110, but there might be multiple hops required, possibly including intermediate nodes 110. Each "hop" generally refers to a transfer of information from one node 110 to another node 110 using an inter-node connection 220. Each individual node 110 is capable of communicating with one or more other nodes 110 using its inter-node connections 220, and is capable of communication with any other node 110 using one or more hops.

For example, in one embodiment, the nodes 110 are disposed in a 3×3 array in which each node no has four inter-node connections 220, one each in a north, east, south, and west direction, where the inter-node connections 220 at the edges wrap around and back to the other sides of the array. This has the effect that the node 110 at the extreme northeast corner of the array is coupled by one inter-node connection 220 to the node 110 at the extreme northwest corner and by one inter-node connection 220 to the node 110 at the extreme southeast corner of the array, due to wrap-around.

While this application primarily describes an array in which the nodes 110 are disposed rectilinearly and in which the inter-node connections 220 are also disposed rectilinearly, in the context of the invention, there is no particular requirement for any such limitation. For example, the nodes 110 may alternatively be disposed in any graph structure, with as many or as few inter-node connections 220 as desired or necessary. The inter-node connections 220 need not couple only one node 110 to one other node 110. Moreover, the actual set of inter-node connections 220 need not be static.

Similar to the $1^{st}$ system 100, each node 110 includes an operating system kernel, which provides a hypervisor for emulating and hosting one or more virtual machines 111, and a storage system which replicates data at storage elements 112 at multiple nodes 110. Each node 110 optionally includes other resources, such as a network connection 113 to one or more of the external networks 130, a port 114 coupled to a hardware element such as a USB "dongle" or other device, or another hardware element.

Similar to the $1^{st}$ system 100, each virtual machine 111 can communicate with other virtual machines in, either on the same node 110 or a different node 110, and with the other resources maintained at each node 110, also either on the same node 110 or a different node 110, using network messages 133 which are exchanged using a virtual connection. When a virtual machine 111 and its communication partner (either another virtual machine 111 or a resource) are hosted at the same node no, provided by the node 110 coupling network messages in memory between those virtual machines 111. When a virtual machine 111 and its communication partner (either another virtual machine 111 or a resource) are hosted at different nodes 110, the virtual connection is provided by the node 110 coupling network messages to the other node 110 using one or more inter-node connections 220, as shown by a communication path 221.

Similar to the $1^{st}$ system 100, the $2^{nd}$ system 200 includes an administrative element 140, which could be executed at one or more nodes 110, or at some external device. The administrative element 140 includes a traffic monitor, which includes a set of monitoring instructions, which reviews traffic on one or more of the inter-node connections 220, and determines if that traffic is excessive due to communication between virtual machines 111, such as illustrated by communication path 221. The administrative element 140 includes a traffic optimizer, which includes a set of instructions directed to the operating system kernel to transfer one or more virtual machines 111.

When the traffic optimizer determines that one or more virtual machines 111 and their communication partners (either another virtual machine 111 or a resource) are exchanging "too many" inter-node network messages 133, the traffic optimizer will transfer those virtual machines 111 closer to their communication partners (either other virtual machines 111 or resources), subject to the requirements imposed by availability groups, as described above. In one embodiment, the use of "closer" indicates that the measure of inter-node network messages 133 is reduced by the transfer of one or more virtual machines 11. For example, as shown in the figure, the communication path 221 shows network traffic between a $1^{st}$ virtual machine 111A and a $2^{nd}$ virtual machine 111B.

In particular, in some cases it might not be feasible to transfer a virtual machine 111 to the same node 110 as its communication partner (either another virtual machine 111 or a resource), it might be feasible to transfer that virtual machine 111 to a node 110 which is fewer hops away from the communication partner. For example, it might be feasible to transfer that virtual machine 111 to a node no which is only one hop away, rather than two hops away, from the communication partner, with the effect of reducing load on one or more inter-node connections 220. This is shown in the figure as a transfer of virtual machine 111A to virtual machine 111A', reducing communication with virtual machine 111B to fewer hops. Similarly, it might be feasible to transfer that virtual machine 111 to a node 110 which has a path of less-busy inter-node connections 220 to the communication partner. This is shown in the figure as a transfer of virtual machine 111A to virtual machine 111A", reducing communication with virtual machine 111B to a path of less-busy inter-node connections 220.

Figure 3:
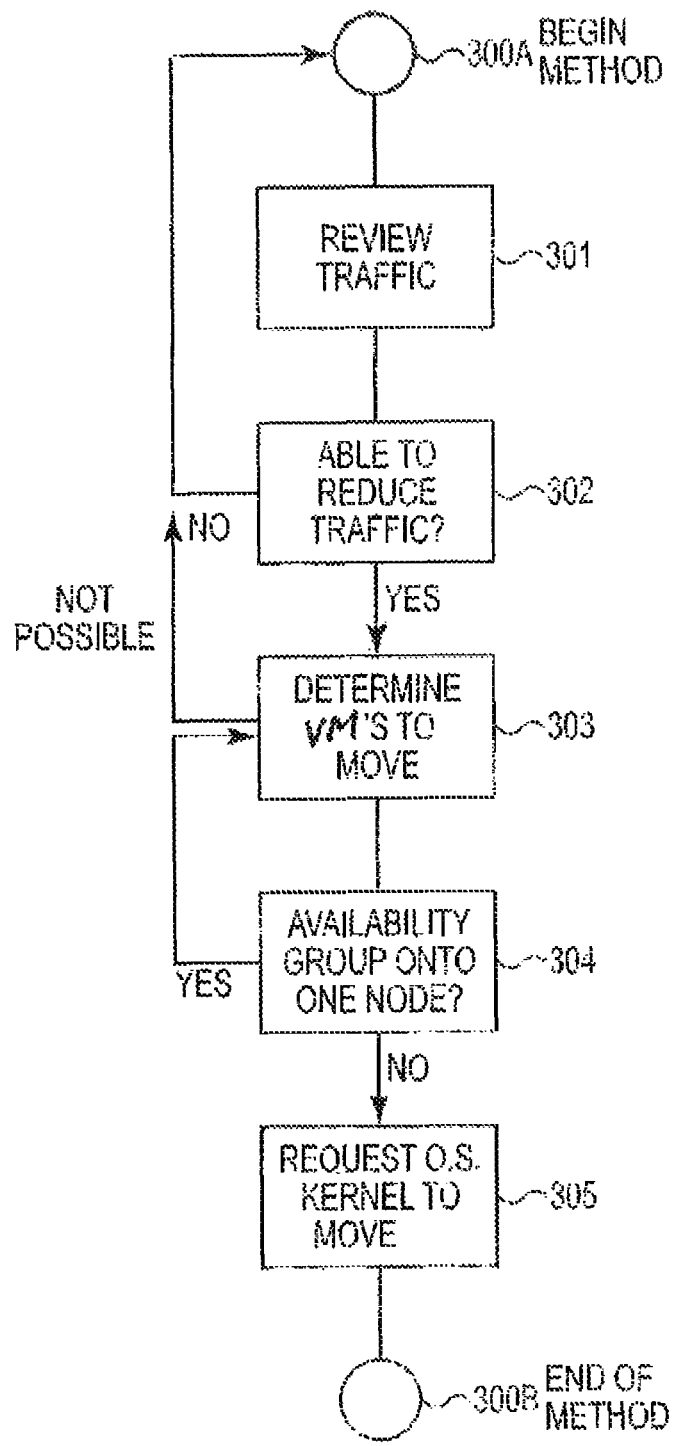
FIG. 3 shows a conceptual block diagram of a method.

FIG. 3 shows a conceptual drawing of a method.

In one embodiment, virtual machines 111 are seamlessly transferred between nodes, in response to availability groups and in response to network traffic generated between those virtual machines 111 and their communication partners (either other virtual machines 111 or resources).

A method performed by the system 100 includes flow points and method steps at least as shown in the figure.

A flow point 300A indicates a beginning of the method. In one embodiment, the method 300 is performed in response to network traffic between virtual machines 111 and their communication partners (either other virtual machines 111 or resources).

At a step 301, the traffic monitor reviews traffic on the inter-node network 120, and determines if that traffic is excessive due to communication between virtual machines iii and their communication partners. In one embodiment, the traffic monitor is part of an administrative element 140, which includes instructions replicated at each of the nodes 110. The nodes 110 cooperate by maintaining a fault-tolerant distributed database.

In one embodiment, the traffic monitor determines if traffic on the inter-node network 120 is excessive in response to an optimization parameter which can be set by one or more users 142. In alternative embodiments, the traffic monitor determines if traffic is excessive in response to a measure of delay observed between virtual machines iii and their communication partners. In other alternative embodiments, the traffic monitor presents measures of network traffic to those one or more users 142, and receives input from those users 142 regarding whether traffic is excessive.

If the traffic monitor determines that traffic is excessive, the method proceeds with the next step. Otherwise, the method returns to the flow point 300A, where it is re-initiated at some later time, possibly substantially immediately.

At a step 302, the traffic optimizer determines if it can reduce the amount of traffic between virtual machines 111 and their communication partners by moving one or more virtual machines in between nodes 110. In one embodiment, the traffic optimizer could determine the amount of traffic between those virtual machines 111 and their communication partners which already travel between nodes 110, and compare that with the amount of traffic between those virtual machines 111 and other communication partners which would travel between nodes 110 if one or more of those virtual machines 111 were moved between nodes 110.

In alternative embodiments, the traffic optimizer could simulate traffic between virtual machines 111 and their communication partners, in response to a history of such traffic.

If the traffic monitor determines that traffic can be reduced, the method proceeds with the next step. Otherwise, the method returns to the flow point 300A, where it is re-initiated at some later time, possibly substantially immediately.

At a step 303, the traffic optimizer determines a set of which one or more virtual machines 111 to move between nodes 110. The traffic optimizer determines whether it can move one or more virtual machines 111 onto the same node 110 as its communication partner. If this is not possible, the traffic optimizer determines whether it can move one or more virtual machines 111 to a node 110 which is closer to its communication partner, as described above with respect to the FIG. 2.

At a step 304, the traffic optimizer determines if, after moving one or more virtual machines in, any availability group would have more than one element (either a virtual machine 111 or a resource) would be combined on the same node 110.

If no availability group would end up combined on the same node 110, the method proceeds with the next step.

Otherwise, the traffic optimizer returns to the just earlier step 303, where it determines a different set of virtual machines 111 to move. If there are no more such sets of virtual machines 111 to move, the method returns to the flow point 300A, where it is re-initiated at some later time, possibly substantially immediately.

At a step 305, the traffic optimizer requests the operating system kernel to move the one or more selected virtual machines 111 between nodes 110, as determined in the just earlier step 304. Techniques for moving virtual machines 111 seamlessly are described in the incorporated disclosures. In one embodiment, the traffic optimizer confirms that the one or more virtual machines iii were properly moved and are being emulated on the one or more transferee nodes 110.

A flow point 300 indicates an end of the method. In one embodiment, the method is re-initiated at some later time, possibly substantially immediately.

The invention claimed is:

1. A method, including steps of:
in a fault-tolerant system having a plurality of nodes and a network by which said nodes communicate, said fault-tolerant system defining one or more availability groups, determining a measure of network use between a virtual machine hosted by said system and a resource available at one or more of said nodes; and
positioning said virtual machine and said resource relative to each other in response to said measure of network use and in response to whether any said availability group includes both said virtual machine and said resource;
wherein said availability groups include one or more of:
a hard availability group, wherein said resource and said virtual machines cannot be safely positioned on a single said node without said single node posing a single point of failure;
a soft availability group, wherein said resource and said virtual machines can be positioned on a single said node, wherein when said single node fails, said resource can be recovered with a measure of effort.

2. A method as in claim 1, wherein
said availability groups include one or more of:
a pairing of two or more said resources;
a pairing of two or more said virtual machines;
an association of one or more said virtual machines with one or more said resources.

3. A method as in claim 1, wherein
said fault-tolerant system emulates network traffic between virtual machines using a private network among more than one node of said nodes of said system, wherein said private network is not generally available to devices outside said system.

4. A method as in claim 3, wherein
said private network couples each $1^{st}$ node to each $2^{nd}$ node using a single communication channel.

5. A method as in claim 3, wherein
said private network couples each $1^{st}$ node to one or more $2^{11d}$ nodes using two or more communication channels.

6. A method as in claim 1, wherein
said measure of network use is responsive to one or more of:
an amount of communication between said nodes,
a measure of communication quality between said virtual machine and said resource,
a measure of latency between said virtual machine and said resource,
a number of nodes involved in access between said virtual machine and said resource.

7. A method as in claim 1, wherein
said steps of positioning include steps of
moving said resource as close to said virtual machine as possible in response to whether any said availability group includes both said virtual machine and said resource.

8. A method as in claim 1, wherein
said steps of positioning include steps of
moving said virtual machine as close to said resource as possible in response to whether any said availability group includes both said virtual machine and said resource.

9. A method as in claim 1, wherein
said resource includes one or more of:
a $2^{nd}$ virtual machine; a collection of data; a data image for one or more virtual machines; a real or virtual hardware device, driver, or element; a real or virtual network connection; a real or virtual storage element; one or more of a pair of virtual machines in a set thereof.

10. A method as in claim 1, wherein
said steps of positioning include transferring said virtual machine and said resource relative to one another, to one or more selected nodes wherein said measure of network use is minimized, consistent with maintaining said virtual machine and said resource on distinct nodes whenever any said availability group includes both said virtual machine and said resource.

11. A method as in claim 1, wherein
said steps of positioning include transferring said virtual machine and said resource relative to one another, to a selected node hosting said virtual machine and resource whenever no availability group includes both said virtual machine and said resource.

12. An apparatus including:
a fault-tolerant system having a plurality of nodes each comprises at least one processor, and a network by which said nodes communicate, said fault-tolerant system defining one or more availability groups,
a traffic optimizer configured to measure of network use between a virtual machine hosted by said system and a resource available at one or more of said nodes; and
a control system configured to position said virtual machine and said resource relative to each other in response to said measure of network use and in response to whether any said availability group includes both said virtual machine and said resource;
wherein said availability groups include one or more of:
a hard availability group, wherein said resource and said virtual machines cannot be safely positioned on a single said node without said single node posing a single point of failure;
a soft availability group, wherein said resource and said virtual machines can be positioned on a single said node, wherein when said single node fails, said resource can be recovered with a measure of effort.

13. The apparatus as in claim 12, wherein
said availability groups include one or more of:
a pairing of two or more said resources;
a pairing of two or more said virtual machines;
an association of one or more said virtual machines with one or more said resources.

14. The apparatus as in claim 12, including
a private network among more than one node of said nodes of said system, said private network emulating network traffic between virtual machines in fault-tolerant system;
wherein said private network is not generally available to devices outside said system.

15. The apparatus as in claim 14, wherein
said private network couples each $1^{st}$ node to each $2^{nd}$ node using a single communication channel.

16. The apparatus as in claim 14, wherein
said private network couples each $1^{st}$ node to one or more $2^{nd}$ nodes using two or more communication channels.

17. The apparatus as in claim 1, wherein:
said traffic optimizer is configured to measure the amount of network use in response to an amount of communication between said nodes, a measure of communication quality between said virtual machine and said resource, a measure of latency between said virtual machine and said resource, a number of nodes involved in access between said virtual machine and said resource.

18. The apparatus as in claim 12, wherein
said control system is disposed to move said resource as close to said virtual machine as possible in response to whether any said availability group includes both said virtual machine and said resource.

19. The apparatus as in claim 12, wherein
said control system is disposed to move moving said virtual machine as close to said resource as possible in response to whether any said availability group includes both said virtual machine and said resource.

20. The apparatus as in claim 12, wherein
said resource includes one or more of:
a $2^{nd}$ virtual machine; a collection of data; a data image for one or more virtual machines; a real or virtual hardware device, driver, or element; a real or virtual network connection; a real or virtual storage element; one or more of a pair of virtual machines in a set thereof.

21. The apparatus as in claim 12, wherein
said control system is disposed to transfer said virtual machine and said resource relative to one another, to one or more selected nodes wherein said measure of network use is minimized,
consistent with maintaining said virtual machine and said resource on distinct nodes whenever any said availability group includes both said virtual machine and said resource.

22. The apparatus as in claim 12, wherein
said control system is disposed to transfer said virtual machine and said resource relative to one another, to a selected node hosting said virtual machine and resource whenever no availability group includes both said virtual machine and said resource.

23. A non-transitory computer readable medium including instructions interpretable by a computing device, including instructions:
in a fault-tolerant system having a plurality of nodes and a network by which said nodes communicate, said fault-tolerant system defining one or more availability groups,
to determine a measure of network use between a virtual machine hosted by said system and a resource available at one or more of said nodes; and
to position said virtual machine and said resource relative to each other in response to said measure of network use and in response to whether any said availability group includes both said virtual machine and said resource:
wherein said availability groups include one or more of:
a hard availability group, wherein said resource and said virtual machines cannot be safely positioned on a single said node without said single node posing a single point of failure;
a soft availability group, wherein said resource and said virtual machines can be positioned on a single said node, wherein when said single node fails, said resource can be recovered with a measure of effort.

24. The non-transitory computer readable medium as in claim 23, wherein
said availability groups include one or more of:
a pairing of two or more said resources;
a pairing of two or more said virtual machines;
an association of one or more said virtual machines with one or more said resources.

25. The non-transitory computer readable medium as in claim 23, wherein
said fault-tolerant system emulates network traffic between virtual machines using a private network among more than one node of said nodes of said system,
wherein said private network is not generally available to devices outside said system.

26. The non-transitory computer readable medium as in claim 25, wherein
said private network couples each $1^{st}$ node to each $2^{nd}$ node using a single communication channel.

27. The non-transitory computer readable medium as in claim 25, wherein said private network couples each $1^{st}$ node to one or more $2^{nd}$ nodes using two or more communication channels.

28. The non-transitory computer readable medium as in claim 23, wherein
    said measure of network use is responsive to one or more of:
    an amount of communication between said nodes,
    a measure of communication quality between said virtual machine and said resource,
    a measure of latency between said virtual machine and said resource,
    a number of nodes involved in access between said virtual machine and said resource.

29. The non-transitory computer readable medium as in claim 23, wherein
    said instructions to position include instructions
    to move said resource as close to said virtual machine as possible in response to whether any said availability group includes both said virtual machine and said resource.

30. The non-transitory computer readable medium as in claim 23, wherein
    said instructions to position include instructions
    to move said virtual machine as close to said resource as possible in response to whether any said availability group includes both said virtual machine and said resource.

31. The non-transitory computer readable medium as in claim 23, wherein
    said resource includes one or more of:
    a $2^{nd}$ virtual machine; a collection of data; a data image for one or more virtual machines; a real or virtual hardware device, driver, or element; a real or virtual network connection; a real or virtual storage element; one or more of a pair of virtual machines in a set thereof.

32. The non-transitory computer readable medium as in claim 23, wherein
    said instructions to position include instructions
    to transfer said virtual machine and said resource relative to one another, to one or more selected nodes wherein said measure of network use is minimized,
    consistent with maintaining said virtual machine and said resource on distinct nodes whenever any said availability group includes both said virtual machine and said resource.

33. The non-transitory computer readable medium as in claim 23, wherein
    said instructions to position include instructions
    to transfer said virtual machine and said resource relative to one another, to a selected node hosting said virtual machine and resource whenever no availability group includes both said virtual machine and said resource.

* * * * *